(12) United States Patent
Mack

(10) Patent No.: US 8,270,459 B1
(45) Date of Patent: Sep. 18, 2012

(54) STANDALONE TESTING OF A RECEIVER

(75) Inventor: Michael P. Mack, Sunnyvale, CA (US)

(73) Assignee: Qualcomm Atheros, Inc., San Jose, CA (US)

( * ) Notice: Subject to any disclaimer, the term of this patent is extended or adjusted under 35 U.S.C. 154(b) by 370 days.

(21) Appl. No.: 12/562,997

(22) Filed: Sep. 18, 2009

(51) Int. Cl.
*H04B 3/46* (2006.01)
(52) U.S. Cl. ...................................................... 375/224
(58) Field of Classification Search .................. 375/224, 375/296, 316, 327, 350, 376; 455/323; 327/113
See application file for complete search history.

(56) References Cited

U.S. PATENT DOCUMENTS

| | | | |
|---|---|---|---|
| 7,003,263 B2 | 2/2006 | Fischer et al. | |
| 7,251,291 B1 | 7/2007 | Dubuc et al. | |
| 7,593,484 B2 | 9/2009 | Beamish et al. | |
| 2006/0141969 A1* | 6/2006 | Dubash et al. | 455/285 |
| 2007/0153877 A1* | 7/2007 | Siwiak | 375/146 |
| 2007/0189371 A1 | 8/2007 | Yen | |
| 2009/0034651 A1 | 2/2009 | Lan et al. | |
| 2010/0015936 A1 | 1/2010 | Mo et al. | |
| 2010/0066994 A1* | 3/2010 | Petrov et al. | 356/5.1 |

OTHER PUBLICATIONS

Hsieh, Yong-Hsiang et al., "An auto-IIQ calibrated CMOS transceiver for 802.11g", Solid-State Circuits. IEEE Journal 2005, pp. 92-93.
"U.S. Appl. No. 12/328,128 Office Action", Sep. 1, 2011 , 19pages.
Behzad A., et al., "A Fully Integrated MIMO Multi-Band Direct-Conversion CMOS Transceiver for WLAN Applications (802.11 n)", International Solid-State Circuits Conference (ISSCC) 2007 Diaest of Technical Papers 2007, pp. 462-463765.
Behzad A., et al., "A Fully Integrated MIMO Multi-Band Direct-Conversion CMOS Transceiver for WLAN Applications (802.11 n)", International Solid-State Circuits Conference (ISSCC) 2007 Diaest of Technical Papers Feb. 2007, pp. 560-561, 622.
Craninckx J., et al., "A WLAN Direct Up-Conversion Mixer With Automatic Image Rejection Calibration", Solid-State Circuits Conference. 2005. Diaest of Technical Papers. ISSCC. 2005 IEEE International Feb. 2005, pp. 546-547, 616.
Co-pending U.S. Appl. No. 12/779,595, filed May 13, 2010.
Co-pending U.S. Appl. No. 12/328,128, filed Dec. 4, 2008.
"U.S. Appl. No. 12/328,128 Final Office Action", Jan. 26, 2012, 23 pages.
"U.S. Appl. No. 12/779,595 Final Office Action", Aug. 6, 2012, 16 pages.
"U.S. Appl. No. 12/779,595 Office action", Feb. 16, 2012, 19 pages.

* cited by examiner

*Primary Examiner* — Khai Tran
(74) *Attorney, Agent, or Firm* — DeLizio Gilliam, PLLC

(57) ABSTRACT

A system and/or integrated circuit are disclosed that may include a receiver, a harmonic signal generator and a signal injector. The receiver may use at least one signal line to create a baseband signal to further create a quality measure used to improve the quality of reception and based upon the receiver response to the baseband signal. The harmonic signal generator may generate harmonic signal(s) including at least one harmonic component within the receiver's reception range. The signal injector may receive the harmonic signal and a control signal to generate the signal line from the harmonic signal in response to the control signal. The receiver may implement WLAN, Bluetooth, GPS, AM, mobile TV, FM, and/or Television. A transmitter compatible with the receiver may or may not be included, and may be configured to couple at least one of its outputs to the receiver to create a second quality measure.

28 Claims, 5 Drawing Sheets

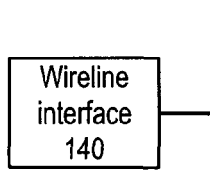
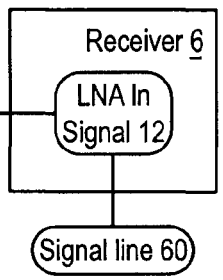
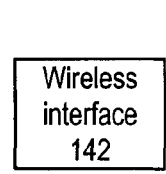
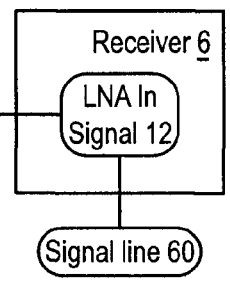
Fig. 12A  Fig. 12B
Fig. 13
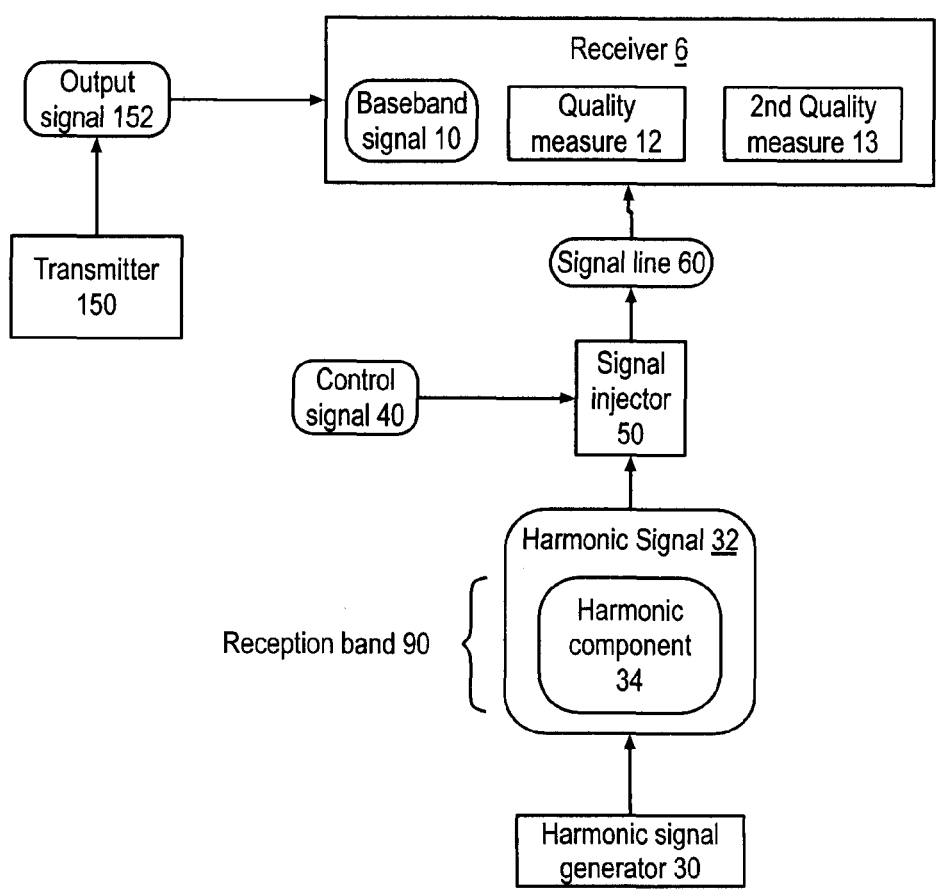

STANDALONE TESTING OF A RECEIVER

TECHNICAL FIELD

This invention relates to testing a receiver without the use of a transmitter and the use of that testing to potentially also test a compatible transmitter.

BACKGROUND OF THE INVENTION

It often desirable to know the amplitude and phase separation between the two signal components that are received by any radio, which will be referred to as in phase (I) and quadrature (Q) components. These components should be exactly ninety degrees out of phase with each other, to maximize signal separation and minimize mirroring of one signal in the other. A receiver can be calibrated by knowing this phase separation to bring it close to this ideal.

One approach to determining the amplitude and phase separation is to feed back a version of a signal generated by the transmitter, when the radio has a transmitter. However the transmitter and/or the receiver may cause an observed amplitude and phase discrepancy. All such a test can initially tell is that there is a amplitude and phase discrepancy, not where it is coming from. With additional circuitry the test signal may be transmitted and looped back through the receiver and then circuit analytic approaches may be used to surmise where the amplitude and phase error is coming from and its magnitude at the source. While this can be made to work with additional circuitry and computation, it does so at a price of complexity for the calibration and by requiring a large number of samples to insure the needed accuracy, which in turn may lengthen the calibration time.

Worse yet, several kinds of radios lack a transmitter, such as a Global Positioning System (GPS) receiver, an Amplitude Modulated (AM) receiver, a mobile TV receiver, a Frequency Modulated (FM) receiver, and a Television receiver. They have no transmitters that can be used to calibrate their amplitude and phase separation. Inexpensive, accurate mechanisms and amplitude and phase calibration methods are needed for receivers without requiring a transmitter.

SUMMARY OF THE INVENTION

Embodiments may include a system and/or an integrated circuit that may include a receiver, a harmonic signal generator and a signal injector configured as follows. The receiver may use at least one signal line to create a baseband signal to further create a quality measure based upon a response by the receiver to the baseband signal. The harmonic signal generator may generate at least one harmonic signal including at least one harmonic component within a reception range of the receiver. And the signal injector may receive the harmonic signal and a control signal to generate the signal line from the harmonic signal in response to the control signal.

The harmonic signal generator may include an oscillator configured to generate the harmonic signal. The harmonic signal generator may further include a Phase Locked Loop (PLL) implementing the oscillator. The PLL may be configured by at least one control signal to generate at least one harmonic component within at least one physical channel of the reception band.

The receiver may be configured to use at least two signal lines to create the quality measure based upon the response to at least two of the baseband signals. The embodiment may further include an amplitude and/or phase estimator configured to receive the baseband signals to create the quality measure as an estimate of the phase and/or amplitude difference between the baseband signals. The baseband signals may be converted from analog to digital signals to create the test signals. The amplitude and/or phase estimate may be based upon comparing the digital test signals corresponding to the I and the Q baseband signals.

The receiver may implement at least one of the following: a Wireless LAN (WLAN) receiver, a Bluetooth receiver, a Global Positioning System (GPS) receiver, an Amplitude Modulated (AM) receiver, a mobile TV receiver, a Frequency Modulated (FM) receiver, and/or a Television receiver.

The receiver may include a low noise amplifier, a mixer and a front end, with the low noise amplifier configured to accept at least one low noise input signal and generate at least one low noise amplified output signal, the mixer configured to accept at least one mixer input signal based upon the low noise amplified output to create at least one baseband signal for presentation to the front end, and the receiver configured to use at least one signal line to create the quality measure based upon a response to the baseband signal. The signal line may be selected from the low noise input, the low noise amplified output and/or said mixer input signal.

The signal injector may further include at least one transistor configured to gate one of the harmonic signals onto one of the signal lines and/or may include an amplifier and/or may include an analog switch. The signal line may be configured for coupling to a wireline interface and/or a wireless interface.

The embodiment may further include a transmitter compatible with the receiver. The embodiment may further be configured to couple at least one output of the transmitter to the receiver to create a second quality measure.

The method of operating the embodiment may include the following steps: Operating the receiver to use at least one signal line to create at least one baseband signal to further create the quality measure in response to the baseband signal by the receiver. Operating the harmonic signal generator configured to create at least one harmonic signal including at least one harmonic component within the reception band of the receiver. And configuring the signal injector receiving the harmonic signal to inject the signal line based upon a command signal. The signal line injected with the harmonic signal and the quality measure are products of this method.

Operating the receiver may further include operating the LNA and/or the mixer and/or the front end in response to the test signal to create the quality measure.

Operating the harmonic signal generator may further include configuring the harmonic signal generator to generate the harmonic signal with at least one of the harmonic components within a physical channel within the reception band, and/or selecting the physical channel within the reception band, and/or generating a quadrature phase version of the harmonic signal to create a second of the harmonic signals for coupling to a second of the signal lines to further create a second of the baseband signals. The method may further include measuring the baseband signal and the second baseband signal to determine an amplitude and/or phase difference included in the quality measure.

BRIEF DESCRIPTION OF THE DRAWINGS

FIGS. 12A and 12B show the signal line may be configured for coupling to a wireline interface and/or a wireless interface, respectively.

And FIG. 13 shows the system and/or the integrated circuit may further include a transmitter compatible with the receiver that may further be configured to couple at least one output signal of the transmitter to the receiver to create a second, possibly similar, quality measure.

DETAILED DESCRIPTION

This invention relates to testing a receiver without the use of a transmitter and the use of that testing to potentially also test a compatible transmitter. Embodiments may include a system and/or an integrated circuit that may include a receiver, a harmonic signal generator and a signal injector configured as follows.

Figure 1:
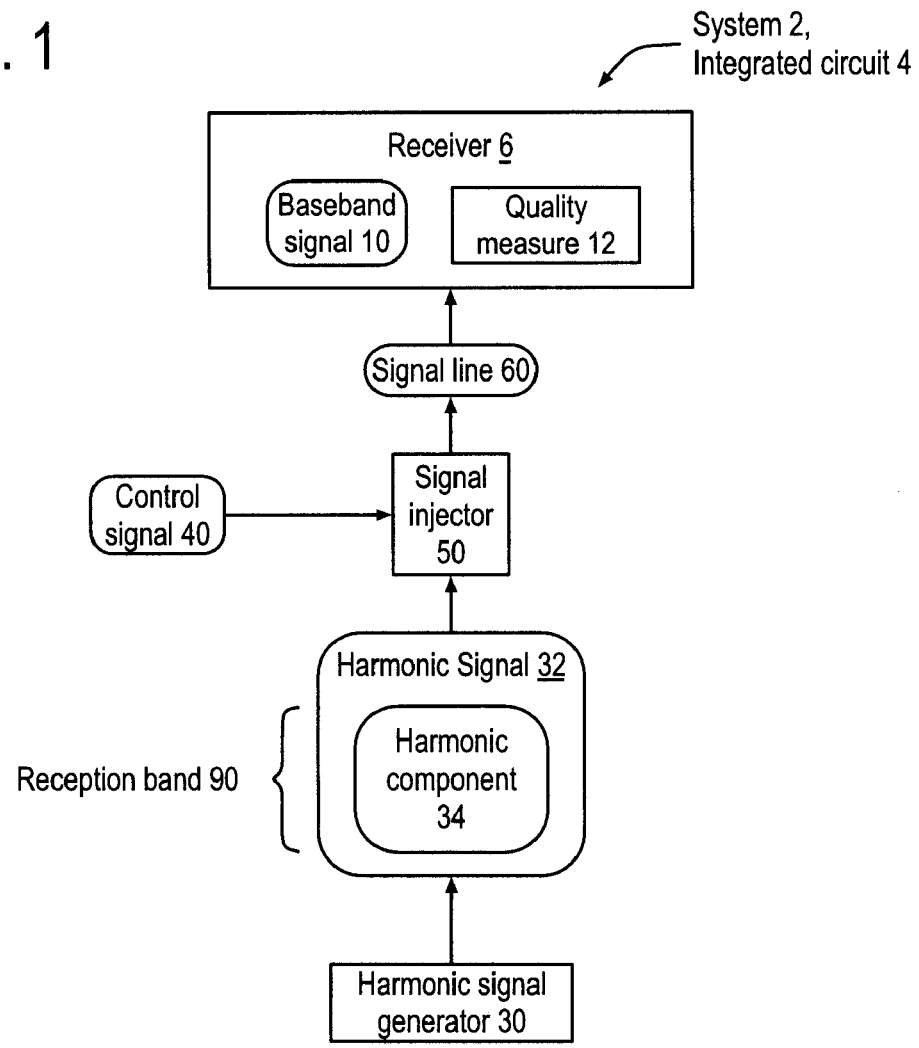
FIG. 1 shows a simplified block diagram of an example embodiment that may include a system and/or an integrated circuit that may include a receiver, a harmonic signal generator and a signal injector.

Referring to the drawings more particularly by reference numbers, FIG. 1 shows a simplified block diagram of an example embodiment that may include a system 2 and/or an integrated circuit 4 that may include a receiver 6, a harmonic signal generator 30 and a signal injector 50 configured as follows. The receiver 6 may use at least one signal line 60 to create a baseband signal 10 to further create a quality measure 12 based upon a response by the receiver 6 to the baseband signal 10. The harmonic signal generator 30 may generate at least one harmonic signal 32 including at least one harmonic component 34 within a reception range 90 of the receiver 6. And the signal injector 50 may receive the harmonic signal 32 and a control signal 40 to generate the signal line 60 from the harmonic signal 32 in response to the control signal 40.

The method of operating the embodiment as the system 2 and/or as the integrated circuit 4 may include the following steps: Operating the receiver 6 to use at least one signal line 60 to create at least one baseband signal 10 to further create the quality measure 12 in response to the baseband signal 10 by the receiver 6. Operating the harmonic signal generator 30 configured to create at least one harmonic signal 32 including at least one harmonic component 34 within the reception band 90 of the receiver 6. And configuring the signal injector 50 receiving the harmonic signal 32 to inject the signal line 60 based upon a command signal 40. The signal line 60 injected with the harmonic signal 32 and the quality measure 12 are products of this method.

Figure 2:
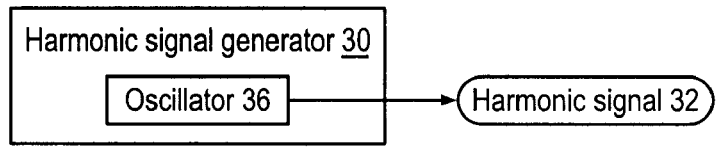
FIGS. 2 to 5 show some details of various embodiments of the harmonic signal generator, the harmonic signal and the harmonic component.
Figure 3:
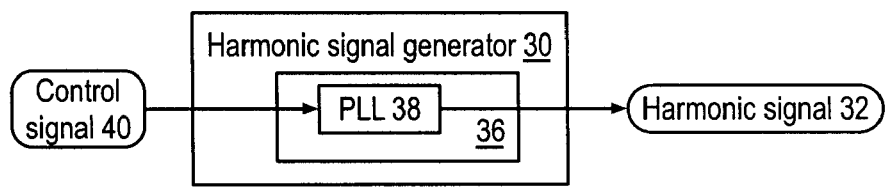
Figure 4:
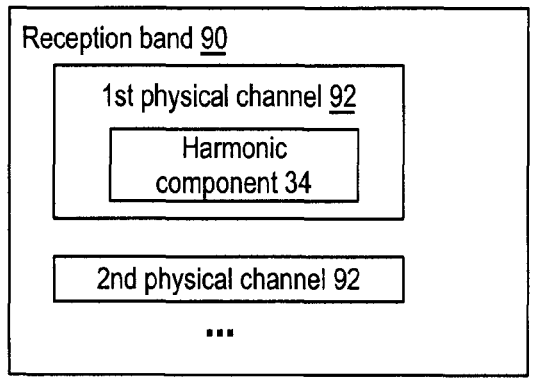
Figure 5:
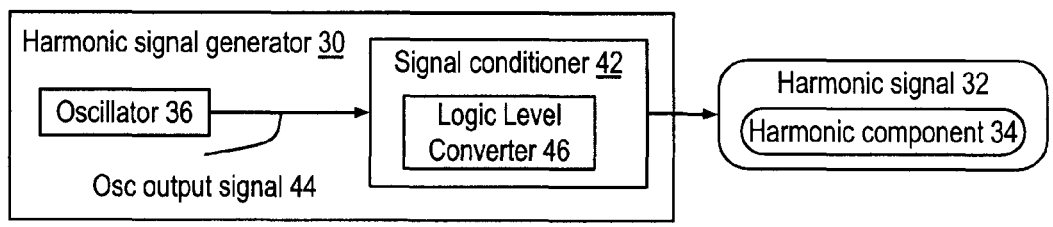

FIGS. 2 to 5 show some details of various embodiments of the harmonic signal generator 30, the harmonic signal 32 and the harmonic component 10. FIG. 2 shows the harmonic signal generator 30 may include an oscillator 36 configured to generate the harmonic signal 32. FIG. 3 shows the harmonic signal generator 30 may further include a Phase Locked Loop (PLL) 38 implementing the oscillator 36. The PLL may be configured by at least one control signal 40 to generate the at least one harmonic component 34 within at least one physical channel 92 of the reception band 90 as shown in FIG. 4. FIG. 5 shows the harmonic signal generator 30 may further include a signal conditioner 42 configured to receive an oscillator output signal 44 from the oscillator 36 to further generate the harmonic signal 32 and its harmonic component 34, with the signal conditioner 42 including a logic level converter 46.

Figure 6:
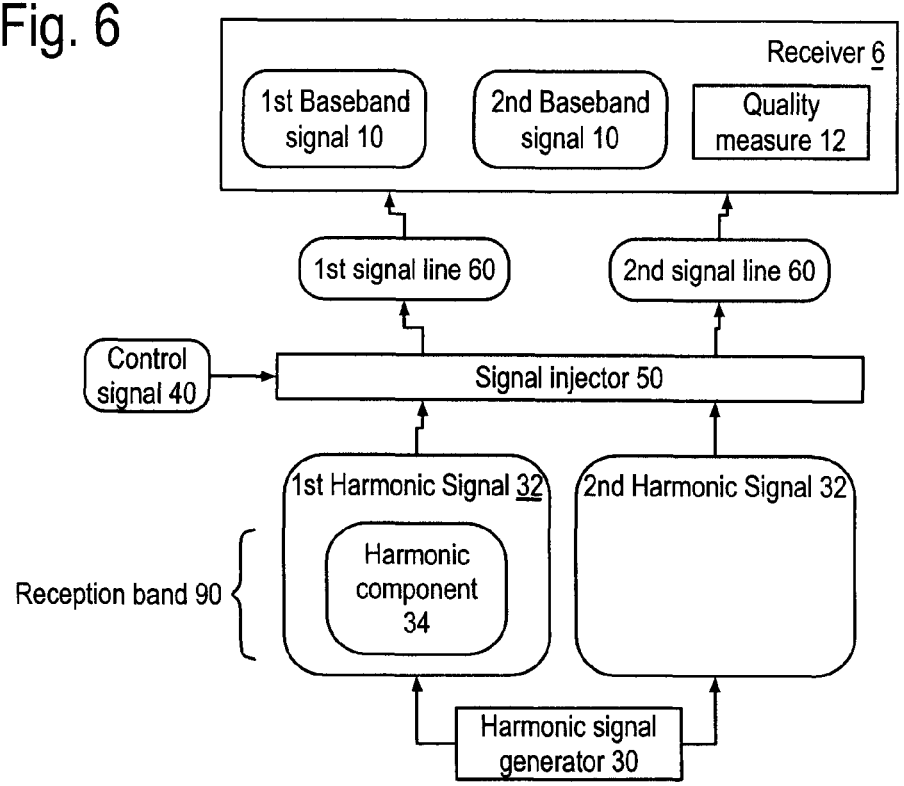
FIG. 6 shows the system and/or the integrated circuit with the receiver configured to use at least two signal lines to create the quality measure based upon the response to at least two baseband signals and FIG. 7 refines FIG. 6 to include an amplitude and/or phase estimator receiving the baseband signals to create the quality measure as an estimate of the amplitude and phase difference between the baseband signals.
Figure 10:
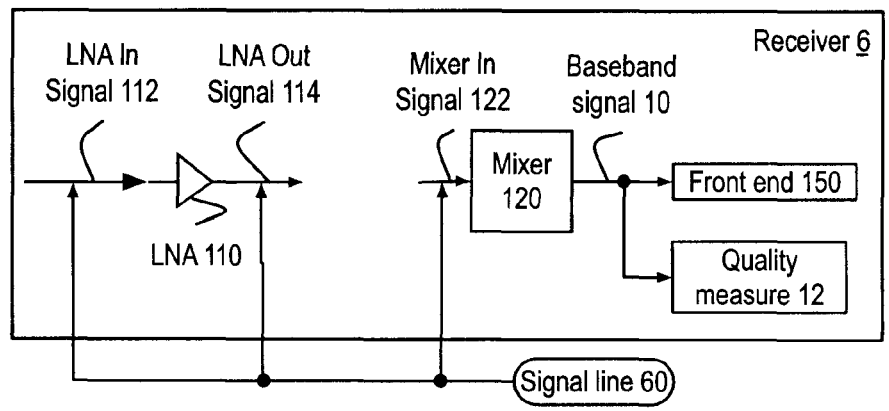

FIG. 6 shows the system 2 and/or the integrated circuit 4 with the receiver 6 configured to use at least two signal lines 60 to create the quality measure 12 based upon the response to at least two of the baseband signals 10. In one embodiment, the two different harmonic signals 32 may be used to develop different quality measures 12. For example, the use of two harmonic signals 32 may determine quality measures 12 at two separate operating points. In such an embodiment, the two harmonic signals 32 may generate two baseband signals 10. Thus, the baseband signals 10 may be not be generated contemporaneously. This figure shows two harmonic signals 32 generated by the signal generator. In other embodiments, only one harmonic signal 32 may generated and injected into the receiver 6 front end, and there may be split into two quadrature signals inside the receiver 6. There are different many ways to generate quadrature versions of the harmonic signals 32, such as mixing with quadrature local oscillators and/or using a passive phase splitter prior to down-conversion. In yet other embodiments, two separate harmonic signals 32 may be used to inject 50 two separate signal lines 60 (again, not necessarily contemporaneously). For instance the first signal line 60 may act on a Low Noise Amplifier (LNA) input signal 112 as shown in FIG. 10 and the second signal line 60 may act on a Mixer input signal 122. Such embodiments may use different harmonic signals 32 to diagnose the amplitude and/or phase distortions.

Figure 7:
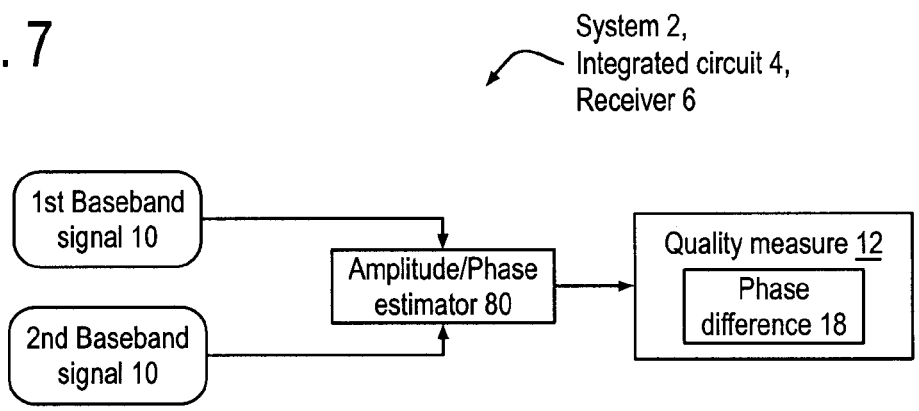

FIG. 7 shows the system 2, the integrated circuit 4 and/or the receiver 6 of FIG. 6 may further include an amplitude and/or phase estimator 80 configured to receive the baseband signals 10 to create the quality measure 12 as an estimate of the amplitude and phase difference 18 between the baseband signals 10.

Figure 8:
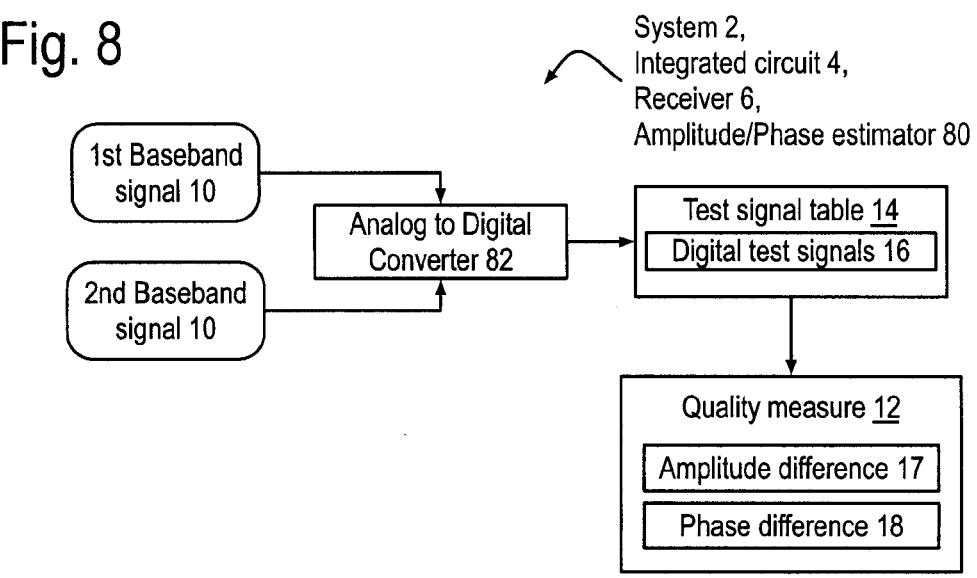
FIG. 8 shows the baseband signals may be converted from analog to digital signals, possibly by at least one analog to digital converter to create digital test signals that may be stored in a test signal table and used by system, the integrated circuit, the receiver and/or the amplitude and/or phase estimator to create the quality measure and/or to create the amplitude and phase difference estimate.

FIG. 8 shows the baseband signals 10 may be converted from analog to digital signals, possibly by at least one analog to digital converter 82 to create digital test signals 16 that may be stored in a test signal table 14 or otherwise processed and used by system 2, the integrated circuit 4, the receiver 6, and/or the amplitude and/or phase estimator 80 to create the quality measure 12 and/or to create a amplitude difference estimate 17 and/or a phase difference estimate 18. The amplitude and/or phase estimator 80 may be based upon comparing the digital test signals corresponding to the I and Q baseband signals 10.

Put another way, FIGS. 2 to 6 show the following refinements regarding the harmonic signal 32 and its generator 30: The harmonic signal generator 30 may configured to generate the harmonic signal 32 with at least one of the harmonic components 34 within a physical channel 92 within the reception band 90. The physical channel 92 may be selected within the reception band 90. And/or a quadrature phase version of the harmonic signal 32 may be generated to create a second of the harmonic signals 32 for coupling to a second of the signal lines 60 to further create a second of the baseband signals 10. Only one harmonic signal 32 may be generated, with the quadrature version of the harmonic signal 32 may be generated in the receiver 6 by the mixer, which may split all inputs into I and Q phases, regardless of their frequencies.

Similarly, FIGS. 6 and 7 show that operating the system 2, the integrated circuit 4 and/or the receiver 6 may further include measuring the baseband signal 10 and the second baseband signal 10 to determine an amplitude difference 17 and/or a phase difference 18 that may be included in the quality measure 12. Note that while a signal may be split into I and Q parts, they will be referenced as the baseband signal 10, even though two parts may be different.

Figure 9:
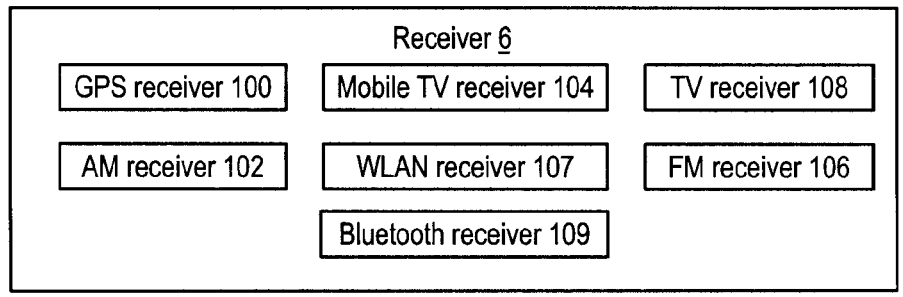
FIGS. 9 and 10 show some details of the receiver.

FIG. 9 shows the receiver 6 may implement at least one of the following: a Global Positioning System (GPS) receiver 100, an Amplitude Modulated (AM) receiver 102, a mobile Television (TV) receiver 104, a Frequency Modulated (FM) receiver 106, a Television receiver 108, a Wireless LAN (WLAN) receiver 107 and/or a Bluetooth receiver 109.

FIG. 10 shows the receiver 6 may include a low noise amplifier 110, a mixer 120 and a front end 150, with the low noise amplifier 110 configured to accept at least one low noise input signal 112 and generate at least one low noise amplified output signal 114, the mixer 120 configured to accept at least one mixer input signal 122 based upon the low noise amplified output signal 114 to create at least one baseband signal 10 for presentation to the front end 150, and the receiver 6 may be configured to use at least one signal line 60 to create the quality measure 12 based upon a response to the baseband signal 10. The signal line 60 may be selected from the low noise input signal 112, the low noise amplified output signal 114 and/or the mixer input signal 122 as shown in the next Figure.

Figure 11:
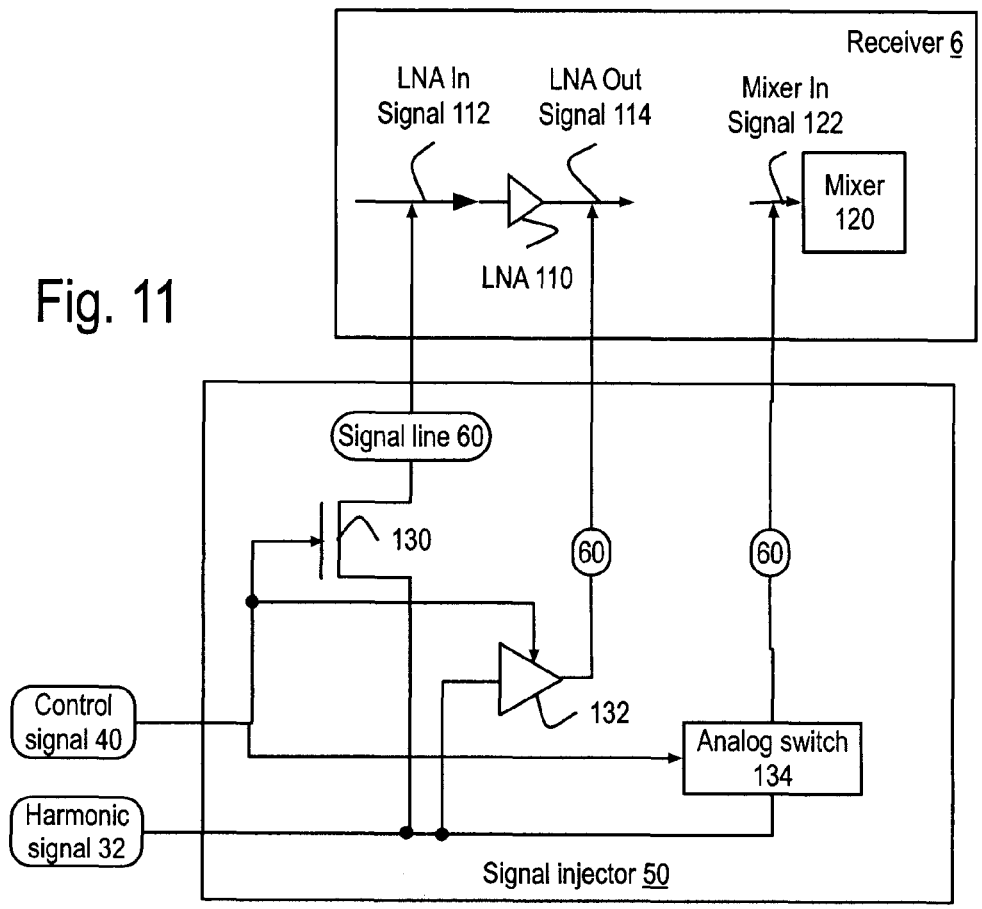
FIG. 11 shows the signal injector may further include at least one transistor configured to gate one of the harmonic signals onto one of the signal lines and/or may include an amplifier and/or may include an analog switch.

FIG. 11 shows the signal injector 50 may further include at least one transistor 130 configured to gate one of the harmonic signals 32 onto one of the signal lines 60 and/or may include an amplifier 132 and/or may include an analog switch 134, any or all of which may be directed in response to the control signal 40. FIGS. 12A and 12B show the signal line 60 may be configured for coupling to a wireline interface 140 and/or to a wireless interface 142, respectively.

FIG. 13 shows the embodiment of the system 2 and/or the integrated circuit 4 may further include a transmitter 150 compatible with the receiver 6. The embodiment may further be configured to couple at least one output signal 152 of the transmitter 150 to the receiver 6 to create a second quality measure 13 that may be similar to the quality measure 12. The transmitter 150 may be remote from the receiver 6. In certain embodiments of the system 2, an embodiment of the method using the harmonic signal 32 may first be employed to derive a quality measure 12 of the receiver 6 estimating its amplitude and phase error 17 and 18. Once the amplitude and phase error 17 and 18 of the receiver 6 has been estimated, then the amplitude and phase error 17 and 18 of the transmitter 150 may be determined through the loop back of the output signal 152 to the receiver 6.

The preceding embodiments provide examples and are not meant to constrain the scope of the following claims.

What is claimed is:

1. An integrated circuit, comprising:
a receiver configured to use at least one signal line to create a baseband signal and to further create a quality measure associated with the receiver based, at least in part, on a response by said receiver to said baseband signal;
a harmonic signal generator configured to generate at least one harmonic signal including at least one harmonic component within a reception band of said receiver; and
a signal injector configured to receive said at least one harmonic signal and a control signal and further configured to generate said signal line from said harmonic signal in response to said control signal.

2. The integrated circuit of claim 1, wherein said harmonic signal generator includes an oscillator configured to generate said harmonic signal.

3. The integrated circuit of claim 2, wherein said harmonic signal generator further includes a Phase Locked Loop (PLL) implementing said oscillator.

4. The integrated circuit of claim 3, wherein said PLL is configured by at least one control signal to generate said at least one harmonic component within at least one physical channel of said reception band.

5. The integrated circuit of claim 1,
wherein said receiver is further configured to use at least two of said signal lines to create at least two of said baseband signals and to further create said quality measure based upon said response to the at least two of said baseband signals; and
wherein said integrated circuit further comprises an amplitude and phase estimator configured to receive said at least two baseband signals and to create said quality measure as an estimate of an amplitude and a phase difference between said baseband signals.

6. The integrated circuit of claim 1, wherein said signal injector further includes at least one member of the group consisting of at least one transistor configured to gate one of said harmonic signals onto one of said signal lines, an amplifier, and an analog switch.

7. The integrated circuit of claim 1, wherein said signal line is coupled to at least one member of the group consisting of a wire line interface and a wireless interface.

8. The integrated circuit of claim 1, wherein said receiver implements at least one member of the group consisting of:
a Wireless Local Area Network (WLAN) receiver, a Bluetooth receiver, a Global Positioning System (GPS) receiver, an Amplitude Modulated (AM) receiver, a mobile television (TV) receiver, a Frequency Modulated (FM) receiver, and a Television receiver.

9. The integrated circuit of claim 1, further comprising a transmitter compatible with said receiver.

10. The integrated circuit of claim 9 further configured to couple at least one output signal of said transmitter to said receiver to create a second of said quality measures.

11. The integrated circuit of claim 1, wherein
said receiver comprises a low noise amplifier, a mixer and a front end,
said low noise amplifier is configured to receive at least one low noise input signal and generate at least one low noise amplified output signal,
said mixer is configured to receive at least one mixer input signal based, at least in part, on said low noise amplified output signal to create at least one baseband signal, wherein the at least one baseband signal is provided to the receiver unit via said front end, and
said receiver is configured to use at least one signal line to create a quality measure based upon a response to said baseband signal.

12. The integrated circuit of claim 11, wherein said signal line is selected from the group consisting of said at least one low noise input signal, said at least one low noise amplified output signal, and said at least one mixer input signal.

13. The integrated circuit of claim 1, wherein the receiver configured to use at least one signal line to create a baseband signal and to further create the quality measure associated with the receiver based, at least in part, on the response by said receiver to said baseband signal comprises the receiver configured to:
  convert the baseband signal from an analog domain to a digital domain to generate a digital test signal; and
  generate the quality measure associated with the receiver based, at least in part, on the digital test signal.

14. The integrated circuit of claim 1, wherein:
the harmonic signal generator is configured to:
  generate the harmonic signal and a second harmonic signal, each of which include at least one harmonic component within the reception band of the receiver,
the signal injector is configured to:
  receive the harmonic signal, the second harmonic signal, and the control signal;
  generate the signal line and a second signal line from the harmonic signal and the second harmonic signal in response to the control signal; and
the receiver is configured to:
  use the signal line and the second signal line to create the baseband signal and the second baseband signal respectively; and
  generate the quality measure associated with the receiver based, at least in part, on the baseband signal and the second baseband signal.

15. The integrated circuit of claim 14, wherein the second harmonic signal is a quadrature representation of the harmonic signal.

16. The integrated circuit of claim 14, wherein the receiver configured to generate the quality measure associated with the receiver based, at least in part, on the baseband signal and the second baseband signal comprises the receiver configured to:
  determine an amplitude difference between the baseband signal and the second baseband signal and a phase difference between the baseband signal and the second baseband signal, wherein the quality measure comprises the amplitude difference and the phase difference.

17. A method comprising:
  creating, at a communication system, at least one harmonic signal including at least one harmonic component within a reception band of a receiver unit of the communication system;
  generating a signal line at the communication system based, at least in part, on the at least one harmonic signal and a command signal;
  injecting said signal line, generated based upon the command signal and the harmonic signal, to the receiver unit of the communication system; and
  generating, at the receiver unit of the communication system, at least one baseband signal based, at least in part, on said injecting said signal line to the receiver unit of the communication system; and
  determining, at the receiver unit of the communication system, a quality measure associated with the receiver unit based, at least in part, on the at least one baseband signal.

18. The method of claim 17, wherein said determining, at the receiver unit of the communication system, the quality measure associated with the receiver unit based, at least in part, on the at least one baseband signal further comprises:
  using a Low Noise Amplifier (LNA) of the communication system, a mixer of the communication system, and a front end of the communication system in conjunction with the receiver unit for said determining the quality measure associated with the receiver unit based, at least in part, on the at least one baseband signal,
  wherein said using the Low Noise Amplifier (LNA) of the communication system, the mixer of the communication system, and the front end of the communication system in conjunction with the receiver unit for said determining the quality measure associated with the receiver unit based, at least in part, on the at least one baseband signal further comprises at least one of:
    using said LNA of the communication system in response to receiving said signal line to create said quality measure associated with the receiver unit;
    using said mixer of the communication system in response to receiving said signal line to create said quality measure associated with the receiver unit; and
    using said front end of the communication system in response to receiving said signal line to create said quality measure associated with the receiver unit.

19. The method of claim 18, further comprising:
  receiving, using at least one low noise amplifier of the receiver unit, at least one low noise input to generate at least one low noise amplified output;
  receiving, using a mixer of the receiver unit, at least one mixer input signal based, at least in part, on said low noise amplified output to create at least one baseband signal; and
  wherein said signal line is a member of the group consisting of said at least one low noise input, said at least one low noise amplified output and said at least one mixer input signal.

20. The method of claim 17, wherein said creating the at least one harmonic signal including at least one harmonic component within the reception band of the receiver unit of the communication system comprises:
  creating, using a harmonic signal generator of the communication system, the at least one harmonic signal including the at least one harmonic component within a physical channel within said reception band of the receiver unit of the communication system.

21. The method of claim 20, wherein said creating the at least one harmonic signal including the at least one harmonic component within the physical channel within the reception band of the receiver unit of the communication system further comprises:
  selecting said physical channel within said reception band of the receiver unit of the communication system.

22. The method of claim 17, wherein said creating the at least one harmonic signal including at least one harmonic component within the reception band of the receiver unit of the communication system further comprises:
  generating a quadrature phase version of said harmonic signal to create a second of said harmonic signals for coupling to a second of said signal lines to further create a second of said baseband signals.

23. The method of claim 22, further comprising:
  measuring said baseband signal and said second of said baseband signals to determine an amplitude difference and a phase difference included in said quality measure.

24. The method of claim 17, comprising:
  coupling said signal line to at least one member of the group consisting of a wireline interface and a wireless interface.

25. The method of claim 17, wherein said receiver unit comprises at least one member of the group consisting of:
  a Wireless Local Area Network (WLAN) receiver, a Bluetooth receiver, a Global Positioning System (GPS) receiver, an Amplitude Modulated (AM) receiver, a mobile television (TV) receiver, a Frequency Modulated (FM) receiver, and a Television receiver.

26. The method of claim 17, wherein the communication system further comprises a transmitter unit compatible with said receiver unit.

27. The method of claim 26, further comprising:
providing at least one output signal, using the transmitter unit of the communication system, to create said baseband signal to further create a second of said quality measures based, at least in part, on said response by said receiver to said baseband signal.

28. A system, comprising:
a receiver configured to use at least one signal line to create a baseband signal to further create a quality measure based upon a response by said receiver to said baseband signal;
a harmonic signal generator configured to generate at least one harmonic signal including at least one harmonic component within a reception band of said receiver; and
a signal injector configured to receive said at least one harmonic signal and a control signal and further configured to generate said signal line from said harmonic signal in response to said control signal.

* * * * *